United States Patent
Shin et al.

(10) Patent No.: US 11,456,502 B2
(45) Date of Patent: Sep. 27, 2022

(54) BATTERY MODULE, BATTERY PACK COMPRISING SAME BATTERY MODULE, AND VEHICLE COMPRISING SAME BATTERY PACK

(71) Applicant: LG Chem, Ltd., Seoul (KR)

(72) Inventors: Eun-Gyu Shin, Daejeon (KR); Jeong-O Mun, Daejeon (KR); Yoon-Koo Lee, Daejeon (KR)

(73) Assignee: LG Energy Solution, Ltd.

( * ) Notice: Subject to any disclaimer, the term of this patent is extended or adjusted under 35 U.S.C. 154(b) by 217 days.

(21) Appl. No.: 16/759,067

(22) PCT Filed: Jul. 3, 2019

(86) PCT No.: PCT/KR2019/008171
§ 371 (c)(1),
(2) Date: Apr. 24, 2020

(87) PCT Pub. No.: WO2020/009483
PCT Pub. Date: Jan. 9, 2020

(65) Prior Publication Data
US 2021/0083241 A1 Mar. 18, 2021

(30) Foreign Application Priority Data
Jul. 3, 2018 (KR) .................... 10-2018-0077300

(51) Int. Cl.
*H01M 50/20* (2021.01)
*H01M 50/502* (2021.01)

(52) U.S. Cl.
CPC ......... *H01M 50/20* (2021.01); *H01M 50/502* (2021.01); *H01M 2220/20* (2013.01)

(58) Field of Classification Search
CPC ............. H01M 50/20; H01M 50/502; H01M 2220/20; H01M 50/105; H01M 50/507;
(Continued)

(56) References Cited

U.S. PATENT DOCUMENTS 8,980,465 B2 * 3/2015 Ahn .................... H01M 50/557
429/178
2007/0207377 A1 9/2007 Han et al.
(Continued)

FOREIGN PATENT DOCUMENTS

JP 2007073510 A 3/2007
JP 2012059698 A 3/2012
(Continued)

OTHER PUBLICATIONS

International Search Report from Application No. PCT/KR2019/008171 dated Oct. 28, 2019, 2 pages.
(Continued)

*Primary Examiner* — Michael L Dignan
(74) *Attorney, Agent, or Firm* — Lerner, David, Littenberg, Krumholz & Mentlik, LLP

(57) ABSTRACT

A battery module includes a plurality of battery cells stacked to be electrically connected to each other, each battery cell of the plurality of battery cells having a pair of electrode leads, a plurality of cell cartridges each configured to cover a protruding portion of one of the electrode leads, and a plurality of block bus bars respectively provided to the plurality of cell cartridges and respectively electrically connected to the electrode leads, the plurality of block bus bars each having a guide coupling formed on at least one side thereof to protrude along a stacking direction of the plurality of battery cells.

12 Claims, 15 Drawing Sheets

(58) Field of Classification Search
CPC .. H01M 50/50; H01M 50/512; H01M 50/516;
H01M 50/531; Y02E 60/10
See application file for complete search history.

(56) References Cited

U.S. PATENT DOCUMENTS

| | | |
|---|---|---|
| 2007/0264563 A1 | 11/2007 | Yoon et al. |
| 2012/0009462 A1 | 1/2012 | Barter et al. |
| 2012/0028097 A1* | 2/2012 | Oury ................ H01M 10/0413 |
| | | 429/120 |
| 2012/0064387 A1 | 3/2012 | Kim |
| 2012/0237815 A1 | 9/2012 | Kwak et al. |
| 2013/0143450 A1 | 6/2013 | Casses et al. |
| 2013/0306353 A1 | 11/2013 | Zhao |
| 2015/0064540 A1 | 3/2015 | Roh et al. |
| 2016/0126523 A1 | 5/2016 | Arena et al. |
| 2016/0190663 A1 | 6/2016 | Bahrami et al. |
| 2016/0254505 A1* | 9/2016 | Eom .................. H01M 50/105 |
| | | 429/7 |
| 2017/0279096 A1 | 9/2017 | Hasegawa |
| 2018/0194235 A1 | 7/2018 | Kim et al. |
| 2020/0083514 A1* | 3/2020 | Enomoto ............ H01M 50/543 |

FOREIGN PATENT DOCUMENTS

| | | |
|---|---|---|
| JP | 2012123980 A | 6/2012 |
| JP | 2013533586 A | 8/2013 |
| JP | 201422195 A | 2/2014 |
| JP | 5496522 B2 | 5/2014 |
| JP | 2014179237 A | 9/2014 |
| JP | 2015517728 A | 6/2015 |
| KR | 20070025391 A | 3/2007 |
| KR | 100920210 B1 | 10/2009 |
| KR | 20130137299 A | 12/2013 |
| KR | 101718056 B1 | 3/2017 |
| KR | 20170050509 A | 5/2017 |
| KR | 20170059979 A | 5/2017 |
| KR | 20170084500 A | 7/2017 |
| KR | 20170087084 A | 7/2017 |
| WO | 2016181608 A1 | 11/2016 |
| WO | 2017150807 A1 | 9/2017 |
| WO | 2017209141 A1 | 12/2017 |

OTHER PUBLICATIONS

Extended European Search Report including Written Opinion for Application No. 19830344.8 dated Mar. 11, 2021, 7 pages.

* cited by examiner

BATTERY MODULE, BATTERY PACK COMPRISING SAME BATTERY MODULE, AND VEHICLE COMPRISING SAME BATTERY PACK

CROSS-REFERENCE TO RELATED APPLICATIONS

The present application is a national phase entry under 35 U.S.C. § 371 of International Application No. PCT/KR2019/008171, filed Jul. 3, 2019, which claims priority to Korean Patent Application No. 10-2018-0077300 filed on Jul. 3, 2018 in the Republic of Korea, the disclosures of which are incorporated herein by reference.

TECHNICAL FIELD

The present disclosure relates to a battery module, a battery pack including the battery module, and a vehicle including the battery pack.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module having at least one battery cell first, and then configure a battery pack by using at least one battery module and adding other components.

In the conventional battery module, generally, after the battery cells are mounted to the cell cartridges to stack the cell cartridges or after only the battery cells are stacked on each other, the electrode lead and the bus bar are welded for electrical connection of the battery cells. In the conventional welding, the facing electrode leads of the stacked battery cells are firstly bent into a predetermined shape through a bending process and then welded to the bus bar.

However, in the conventional module assembling process in which the electrode leads of the battery cells and the bus bar are welded after the cell cartridges are stacked or the battery cells are stacked, if an alignment error occurs when the cell cartridges or the battery cells are stacked, the assembly and weldability of the bar and the electrode leads is degraded.

In addition, in the conventional battery module, the process of bending the facing electrode leads should be performed first before the electrode leads and the bus bar are welded, thereby deteriorating the efficiency of the overall module assembling process.

DISCLOSURE

Technical Problem

The present disclosure is directed to providing a battery module, which may improve the efficiency of an assembling process, a battery pack including the battery module, and a vehicle including the battery pack.

In addition, the present disclosure is directed to providing a battery module, which may improve weldability when performing welding to electrically connect electrode leads and a bus bar, a battery pack including the battery module, and a vehicle including the battery pack.

Technical Solution

In one aspect of the present disclosure, there is provided a battery module, comprising: a plurality of battery cells stacked to be electrically connected to each other, each battery cell of the plurality of battery cells having a pair of electrode leads; a plurality of cell cartridges each configured to cover a protruding portion of one of the electrode leads; and a plurality of block bus bars respectively provided to the plurality of cell cartridges and respectively electrically connected to the electrode leads, the plurality of block bus bars each having a guide coupling formed on at least one side thereof to protrude along a stacking direction of the plurality of battery cells.

The plurality of block bus bars may each be formed in a predetermined length along a longitudinal direction of the plurality of cell cartridges, and the guide couplings of the plurality of block bus bars may be provided to one end of the plurality of block bus bars.

When the plurality of cell cartridges are stacked, the guide coupling of one of the plurality of block bus bars may be coupled to the guide coupling of a facing one of the plurality of block bus bars in the stacking direction.

The guide couplings of the plurality of block bus bars may include: a male coupling configured to protrude to one side in the stacking direction; and a female coupling configured to protrude to another side in the stacking direction to be coupled to the male coupling.

The guide couplings of the plurality of block bus bars may further include a bi-coupling configured to protrude to both sides in the stacking direction and configured to be connected to an external power source.

The bi-coupling may be provided to the block bus bar of the cell cartridge disposed at an outermost side among the plurality of cell cartridges.

Each of the plurality of battery cells may include an electrode assembly; a battery case configured to accommodate the electrode assembly; and the pair of electrode leads configured to protrude from both ends of the battery case and electrically connected to the electrode assembly, and two of the plurality of cell cartridges may be mounted to both ends of the battery case on which the pair of electrode leads protrude, respectively.

The battery case may include a case body having an accommodation space for accommodating the electrode assembly; and case terraces configured to extend from both ends, respectively, of the case body so that the pair of electrode leads protrude thereon, and two of the plurality of cell cartridges may support the pair of electrode leads and the case terraces, respectively.

Each cell cartridge may include an accommodation groove formed at one surface thereof for accommodating one of the electrode leads and one of the case terraces.

A bus bar placing portion may be provided to the accommodation groove for the block bus bar placed thereon.

In addition, the present disclosure provides a battery pack, comprising: at least one battery module according to the above embodiments; and a pack case configured to package the at least one battery module.

Moreover, the present disclosure provides a vehicle, comprising at least one battery pack according to the above embodiment.

Advantageous Effects

According to various embodiments as above, it is possible to provide a battery module, which may the efficiency of an assembling process, a battery pack including the battery module, and a vehicle including the battery pack.

In addition, according to various embodiments as above, it is possible to provide a battery module, which may improve weldability when performing welding to electrically connect electrode leads and a bus bar, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
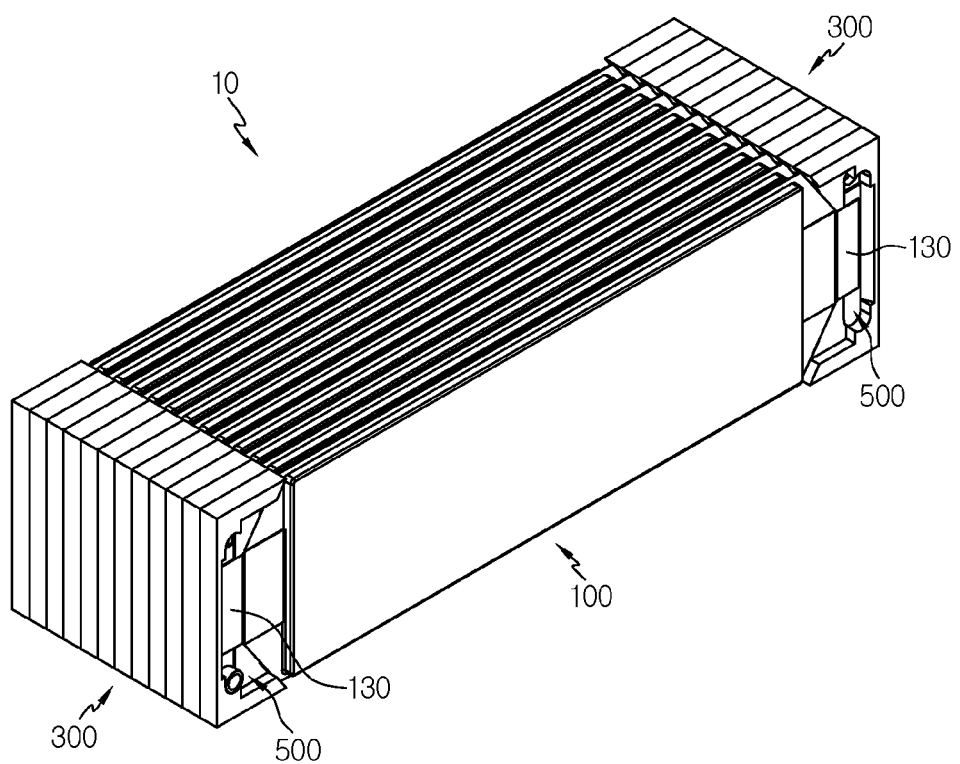
FIG. 1 is a diagram for illustrating a battery module according to an embodiment of the present disclosure.
Figure 2:
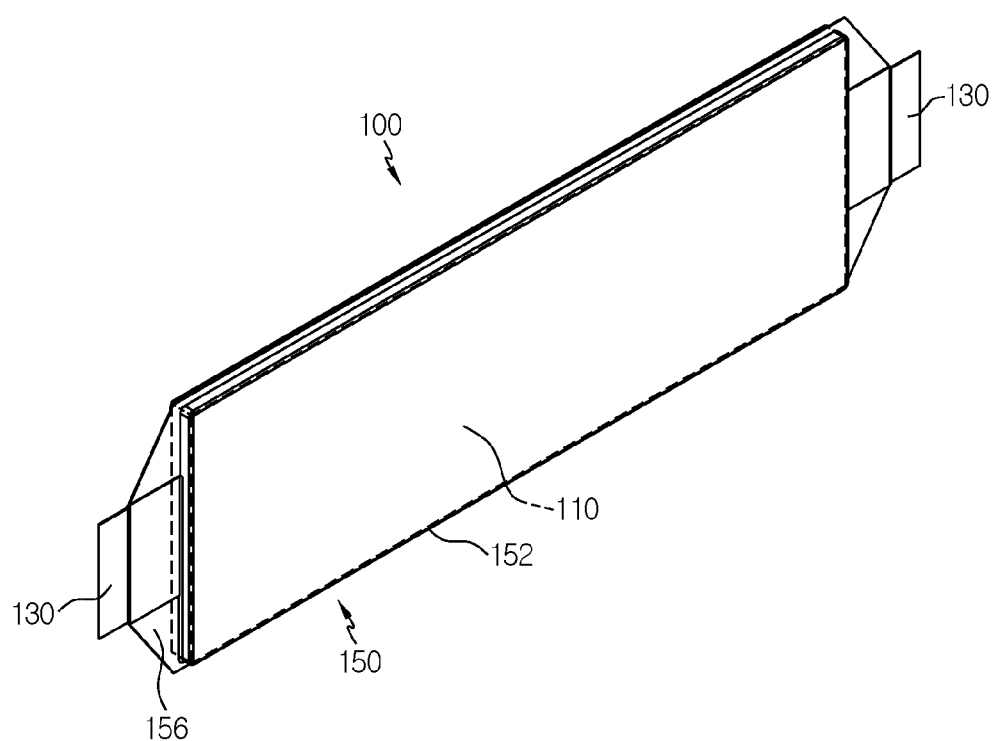
FIG. 2 is a diagram for illustrating a battery cell of the battery module of FIG. 1.
Figure 3:
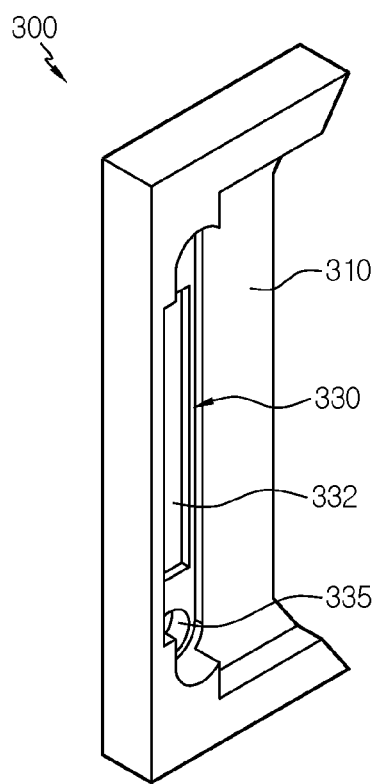
FIG. 3 is a diagram for illustrating a cell cartridge of the battery module of FIG. 1.
Figure 4:
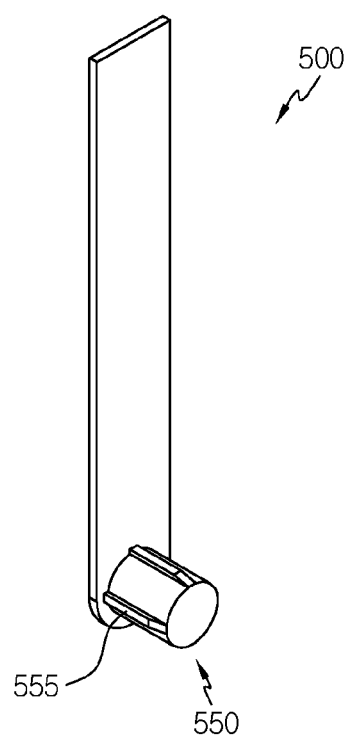
FIGS. 4 to 6 are diagrams for illustrating a block bus bar of the battery module of FIG. 1.
Figure 5:
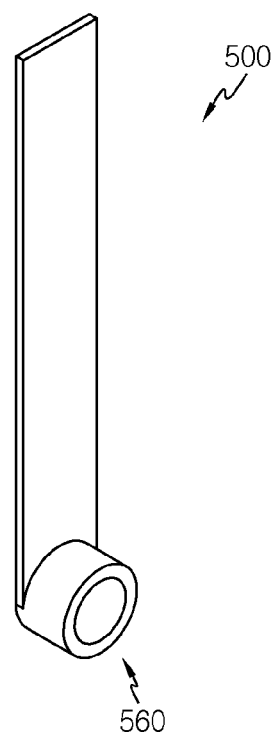
Figure 6:
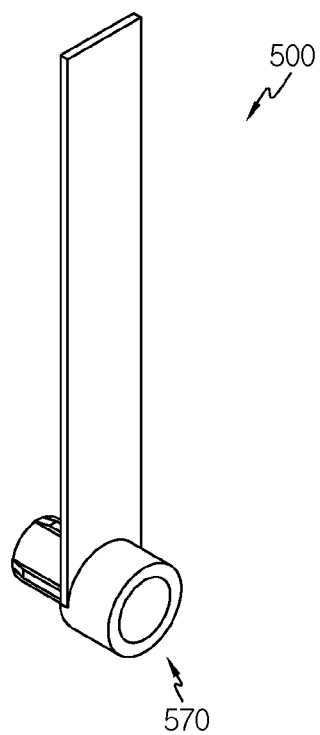

FIG. 1 is a diagram for illustrating a battery module according to an embodiment of the present disclosure, FIG. 2 is a diagram for illustrating a battery cell of the battery module of FIG. 1, FIG. 3 is a diagram for illustrating a cell cartridge of the battery module of FIG. 1, and FIGS. 4 to 6 are diagrams for illustrating a block bus bar of the battery module of FIG. 1.

Referring to FIGS. 1 to 6, a battery module 10 may include a battery cell 100, a cell cartridge 300, and a block bus bar 500.

The battery cell 100 is a secondary battery and may be provided as a pouch-type secondary battery. Specifically, the battery cell 100 may be a pouch-type lithium polymer battery.

The battery cell 100 may be provided in plural. The plurality of battery cells 100 may be stacked to be electrically connected to each other, and each battery cell 100 may include an electrode assembly 110, an electrode lead 130, and a battery case 150.

The electrode assembly 110 may include a positive electrode plate, a negative electrode plate and a separator. The electrode assembly 110 is well known in the art and thus will not be described in detail.

The electrode lead 130 is provided in a pair, and the pair of electrode leads 130 may include a positive electrode lead and a negative electrode lead. The pair of electrode leads 130 are electrically connected to the electrode assembly 110 and may protrude from both ends of the battery case 150, explained later, specifically from both ends of a case terrace 156, explained later.

The battery case 150 may be made of a laminate sheet including a resin layer and a metal layer, and may accommodate the electrode assembly 110 therein. The battery case 150 may include a case body 152 and a case terrace 156.

The case body 150 may accommodate the electrode assembly 110. For this purpose, the case body 150 may have an accommodation space for accommodating the electrode assembly 110.

A case terrace 156 extends from each end of the case body 150, and the pair of electrode leads 130 may respectively protrude thereon. The case terrace 150 may be sealed to make the inside of the case body 150 airtight.

The cell cartridge 300 may cover a portion where one of the pair of electrode leads 130 of the plurality of battery cells 100 protrudes. For this purpose, the cell cartridge 300 may be provided in plural.

The plurality of cell cartridges 300 are arranged along a stacking direction of the plurality of battery cells 100 and may be mounted to both ends of the battery case 150 from which the pair of electrode leads 130 protrudes.

Specifically, the plurality of cell cartridges 300 may be mounted to the case terraces 156, respectively, to cover a portion of the case terrace 156 of the battery case 150 of the plurality of battery cells 100.

Accordingly, the plurality of cell cartridges 300 may support the pair of electrode leads 130 of the battery cells 100 and the case terraces 156 of the battery case 150, respectively.

For this, an accommodation groove 310 for accommodating one of the pair of electrode leads 130 and the case terrace 156 may be formed at one surface of each of the plurality of cell cartridges 300.

The accommodation groove 310 may have a bus bar placing portion 330.

Each block bus bar 500, explained later, may be placed on and fixed to the bus bar placing portion 330, and the bus bar placing portion 330 may have a welding guide groove 332 and a coupling passing hole 335.

The welding guide groove 332 may ensure a welding space when the electrode lead 130 of the battery cell 100 and the block bus bar 500, explained later, are welded, to prevent the cell cartridge 300 from being damaged due to the welding.

When the block bus bars 500, explained later, are coupled to each other, the coupling passing hole 335 may allow guide couplings 550, 560, 570 of the block bus bars 500, explained later, to pass therethrough.

The block bus bar 500 is provided in plural. The plurality of block bus bars 500 are provided to the plurality of cell cartridges 300, respectively, and may be electrically connected to the electrode leads 130 of the plurality of battery cells 100, respectively. Preferably, the block bus bar 500 may be made of metal.

The plurality of block bus bars 500 may be formed in a predetermined length along a longitudinal direction of the plurality of cell cartridges 300 (a height direction of the cell cartridge 300 on the figure). Here, the plurality of block bus bars 500 may be formed longer than the electrode leads 130 of the plurality of battery cells 100 in the height direction of the plurality of cell cartridges 300.

The plurality of block bus bars 500 may include guide couplings 550, 560, 570.

The guide couplings 550, 560, 570 are provided to at least one side of each of the plurality of block bus bars 500 and may protrude from at least one side of the plurality of block bus bars 500 along the stacking direction of the battery cells 100 and the cell cartridges 300.

Specifically, one of the guide couplings 550, 560, 570 may be provided at one end of each of the plurality of block bus bars 500. When the plurality of cell cartridges 300 are stacked, the guide couplings 550, 560 may be coupled with guide couplings 560, 550 of a facing block bus bar 500 in the stacking direction.

Hereinafter, the guide couplings 550, 560, 570 of the plurality of block bus bars 500 will be described in more detail.

The guide couplings 550, 560, 570 of the plurality of block bus bars 500 may include a male coupling 550, a female coupling 560 and a bi-coupling 570.

The male coupling 550 may protrude to any one side in the stacking direction of the block bus bar 500. On an outer surface of the male coupling 550, a coupling guide rib 555 may be formed to increase the coupling with the female coupling 560, explained later.

The female coupling 560 may protrude to the other side in the stacking direction of the block bus bar 500 to be coupled with the male coupling 550. When the cell cartridges 300 are stacked, the female coupling 560 may be coupled with a male coupling 550 of a block bus bar 500 of a facing cell cartridge 300.

The bi-coupling 570 is for connection with an external power source or the like and is provided to a cell cartridge 300 disposed at the outermost side among the plurality of cell cartridges 300. The bi-coupling 570 may protrude to both sides in the stacking direction of the block bus bar 500.

Hereinafter, the process of assembling the battery module 10 according to this embodiment will be described in more detail.

FIGS. 7 to 14 are diagrams for illustrating an assembling process of the battery module of FIG. 1.

Figure 7:
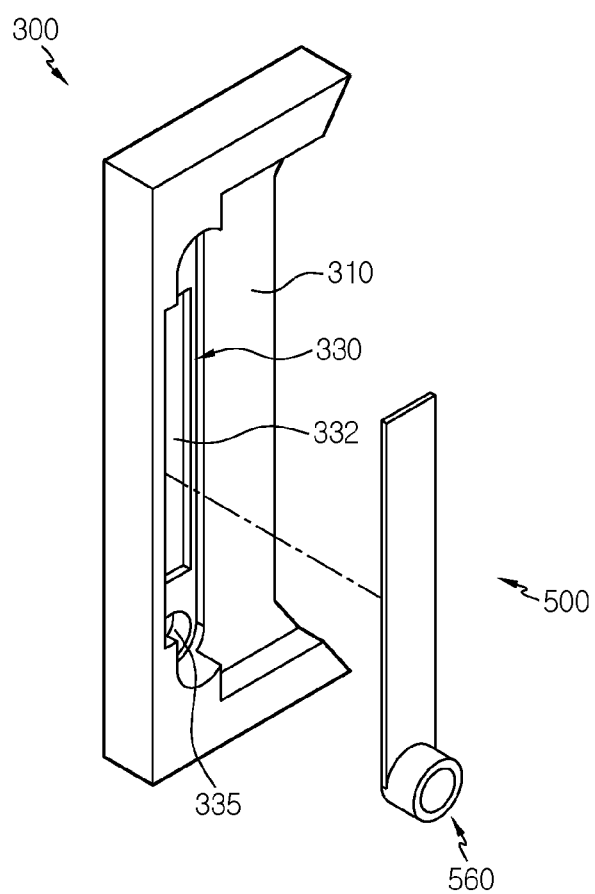
FIGS. 7 to 14 are diagrams for illustrating an assembling process of the battery module of FIG. 1.
Figure 8:
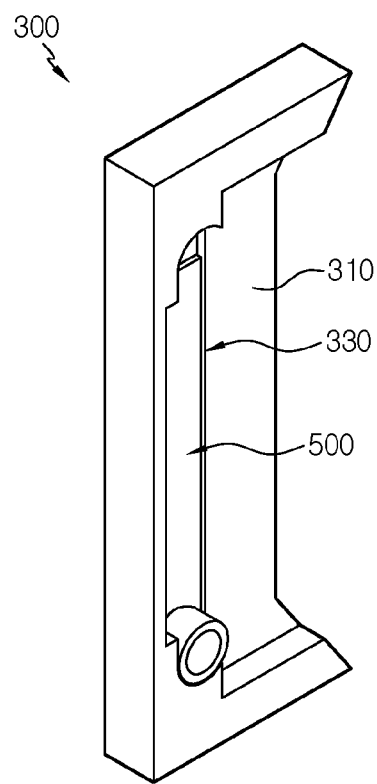

Referring to FIGS. 7 and 8, while the battery module 10 is being assembled, a worker or the like may, firstly, mount the block bus bar 500 on the bus bar placing portion 330 of the cell cartridge 300. Here, the block bus bar 500 may be bonded to the bus bar placing portion 330 by an adhesive, a tape or heat fusion.

Through the bonding and mounting, the block bus bar 500 may be arranged to cover the welding guide groove 332, and the guide coupling 560 may be arranged at a position corresponding to the coupling passing hole 335. Although not shown in the figures, the guide coupling 550, 570 may also be disposed at a position corresponding to the coupling passing hole 335.

Figure 9:
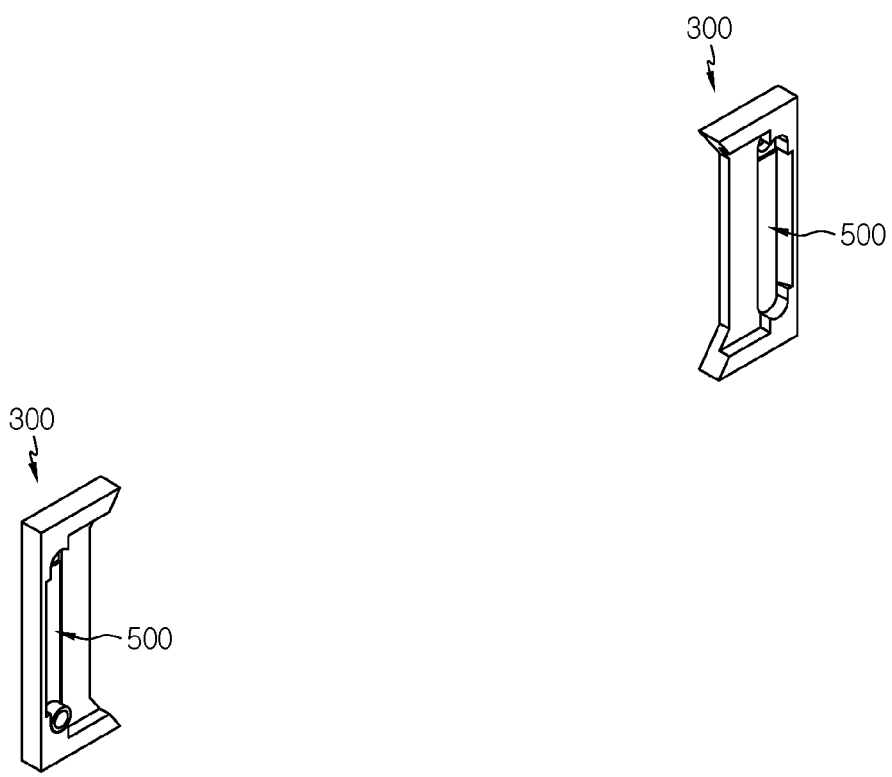
Figure 10:
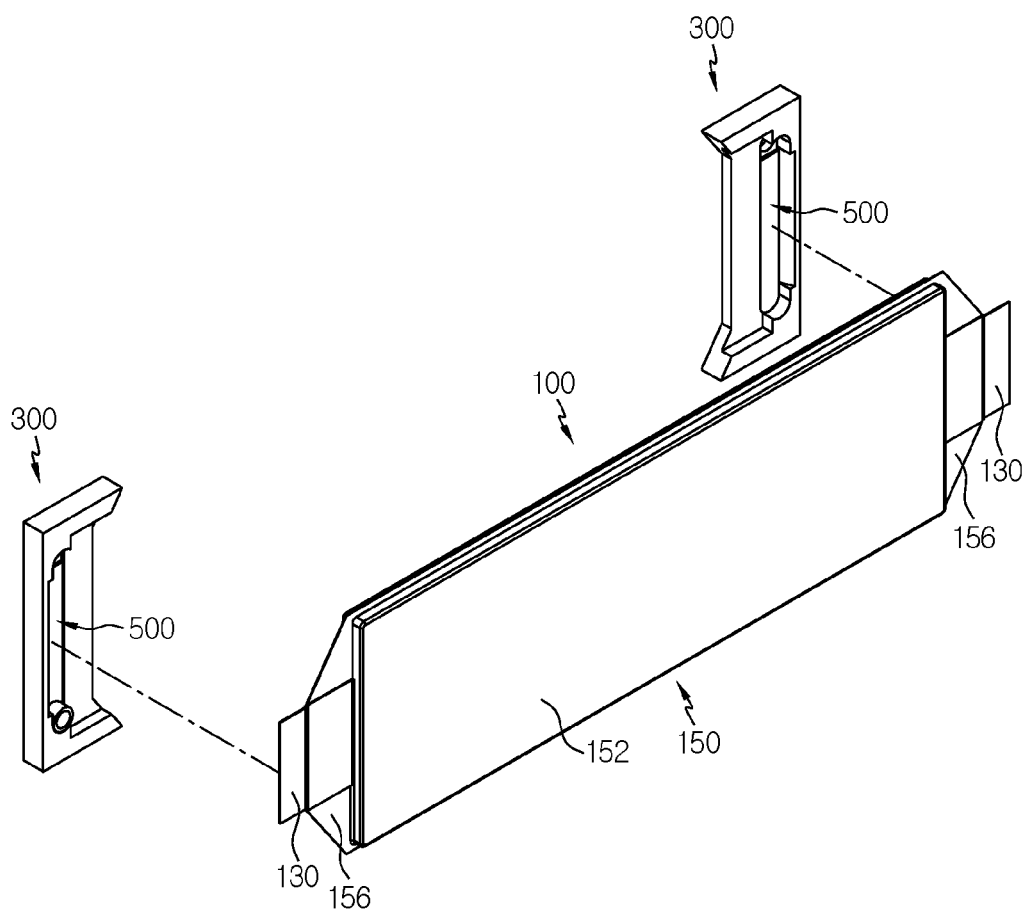
Figure 11:
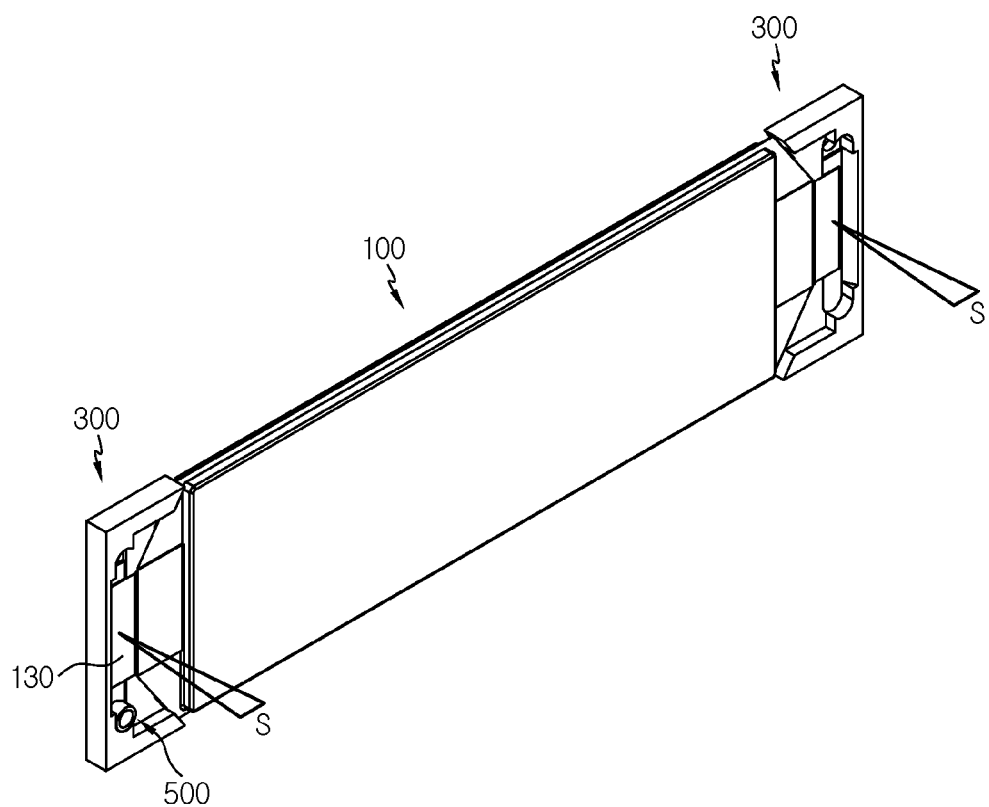

Referring to FIGS. 9 to 11, after that, the worker or the like may place the battery cell 100 on the cell cartridge 300 to which the block bus bar 500 is mounted. Specifically, one battery cell 100 may be placed on a pair of cell cartridges 300. More specifically, the case terraces 156 of the battery case 150 of one battery cell 100 may be placed on the pair of cell cartridges 300, respectively.

After that, the worker or the like may couple the pair of electrode leads 130 of the battery cell 100, which protrude out of the respective case terraces 156, with the respective block bus bars 500 mounted to the cell cartridges 300 by means of laser welding or the like.

In this embodiment, since the electrode leads 130 of the battery cells 100 and the block bus bar 500 are welded before the battery cells 100 are stacked, it is possible to prevent a welding defect caused by an assembly tolerance due to erroneous stacking of the battery cells 100 or erroneous assembling.

In addition, in this embodiment, since the electrode lead 130 is flat without bending, the problems such as a focal distance error and the generation of gap between bonded subjects during the welding process, which may occur due to the bending of the electrode lead 130, may be significantly solved.

Figure 12:
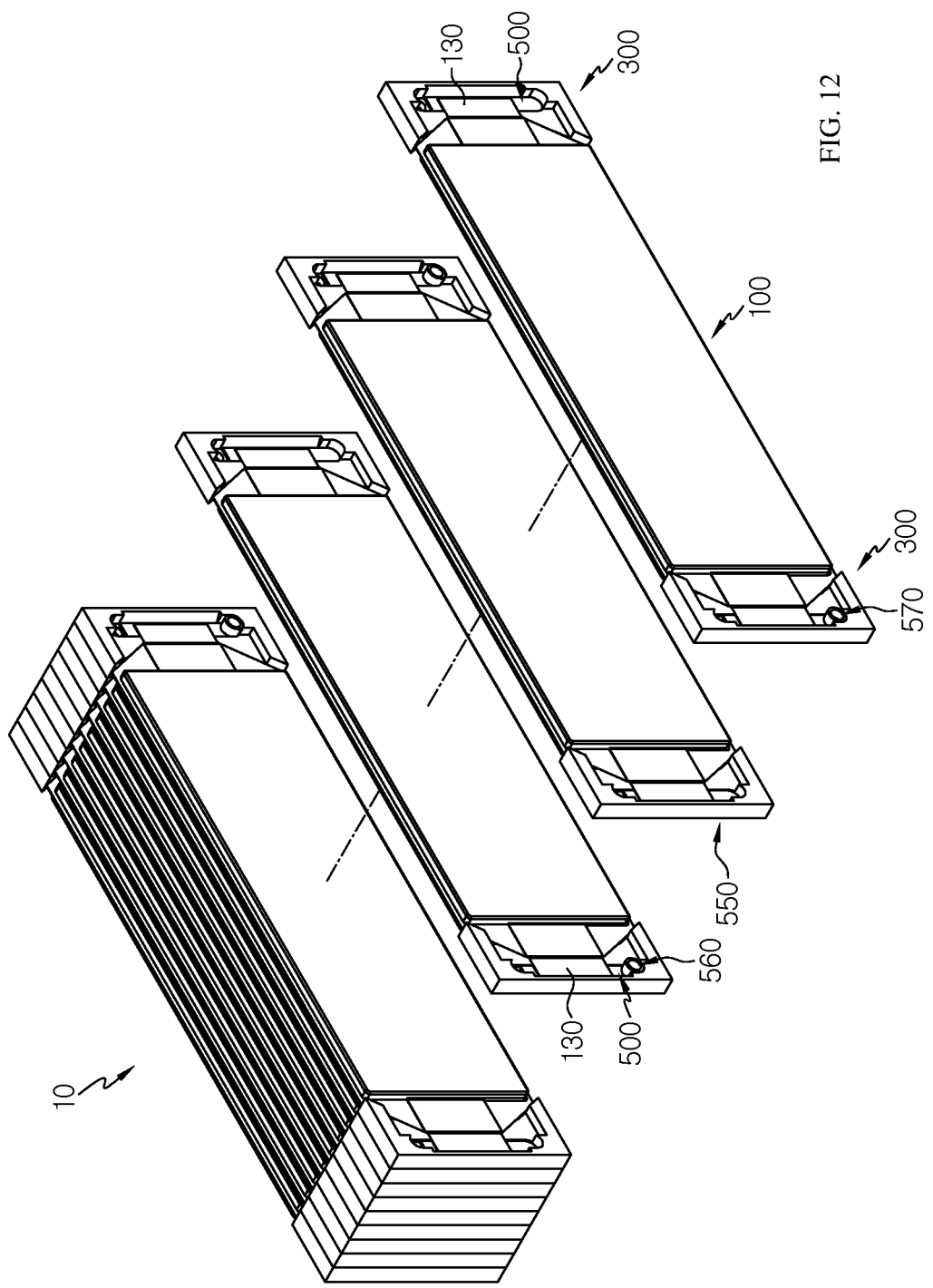
Figure 13:
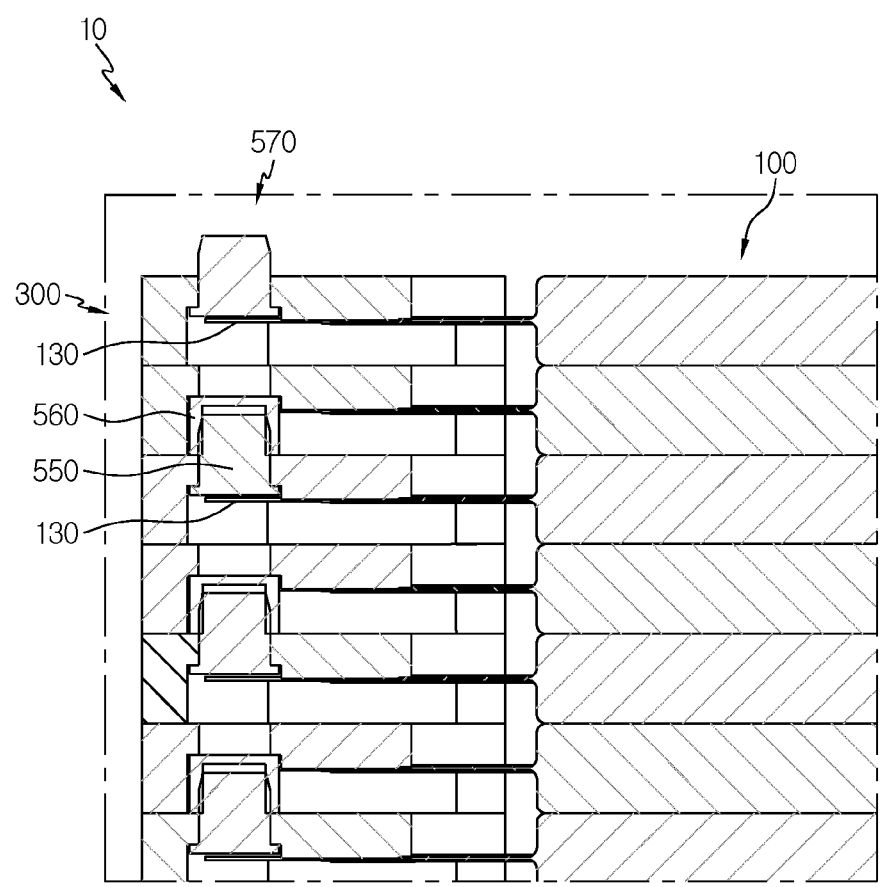
Figure 14:
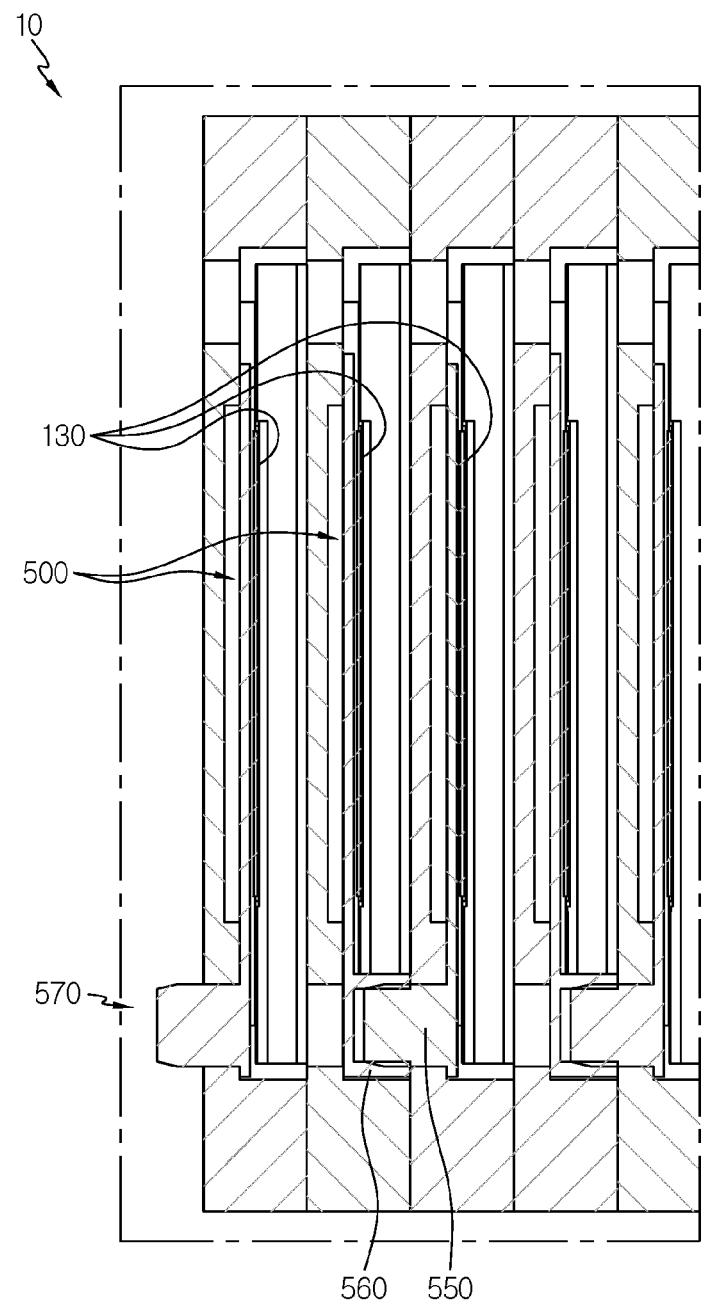

Referring to FIGS. 12 to 14, after that, the worker or the like may stack the battery cells 100, which are coupled with the block bus bar 500 on each cell cartridge 300, to be electrically connected to each other. Here, the electrical connection may include series connection or parallel connection.

At this time, the battery cells 100 may be stacked by coupling the block bus bars 500 provided to the cell cartridges 300 with each other. The block bus bars 500 may be coupled with each other by coupling the guide couplings 550, 560 with each other.

That is, the guide couplings 550, 560 according to this embodiment may electrically connect the battery cells 100 and also guide the battery cells 100 and the cell cartridges 300 to be stacked and assembled.

In other words, by coupling the guide couplings 550, 560 with each other, the battery cells 100 may be electrically connected, and the battery cells 100 and the cell cartridges 300 may be fixed with each other.

Here, the guide couplings 550, 560 may be coupled by means of coupling of the male coupling 550 and the female coupling 560. For example, the male coupling 550 may be press-fit into the female coupling 560.

In addition, when the male coupling 550 and the female coupling 560 are coupled, a heat conductive adhesive or a lubricant may be additionally filled between the male coupling 550 and the female coupling 560 to minimize contact resistance therebetween.

As described above, in this embodiment, since the battery cells 100 facing each other when being stacked are electrically connected by coupling the guide couplings 550, 560 with each other, a process of separately bending the electrode leads 130 may be omitted during the assembling process, and thus the steps required for assembling the battery module 10 may be reduced.

In addition, in this embodiment, it is more convenient to electrically connect to an external power source by means of the guide coupling 570 for connection with the external power source, namely the bi-coupling 570 provided to the cell cartridge 300 disposed at the outermost side.

Meanwhile, in this embodiment, since the cell cartridges 300 do not cover the entirety of the battery cells 100 but covers only a portion of the battery case 150 of the battery cells 100, namely a portion near the case terrace 156, it is possible to minimize the entire volume in the entire battery module 10 is increased due to the cell cartridges 300.

Accordingly, in this embodiment, it is possible to increase the energy density compared to the same size, and it is possible to provide the battery module 10 with a slimmer and more compact design.

Figure 15:
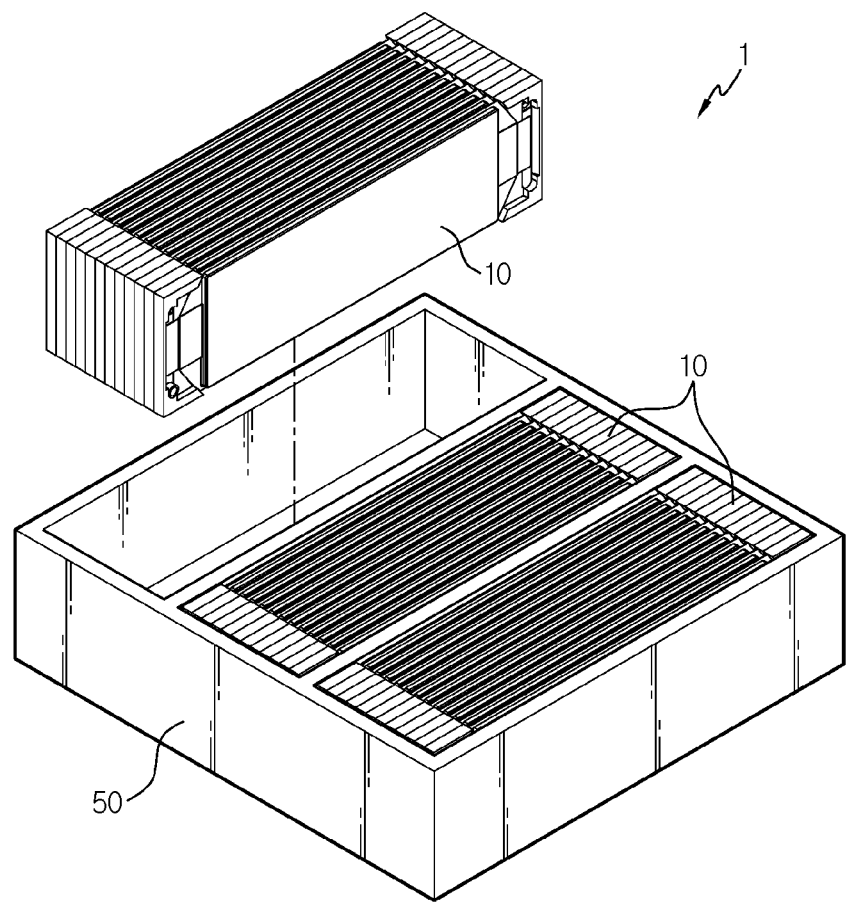
FIG. 15 is a diagram for illustrating a battery pack according to an embodiment of the present disclosure.
Figure 16:
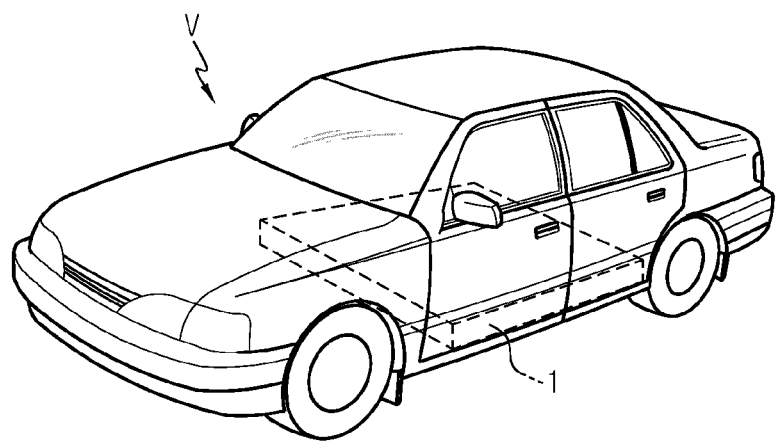
FIG. 16 is a diagram for illustrating a vehicle according to an embodiment of the present disclosure.

FIG. 15 is a diagram for illustrating a battery pack according to an embodiment of the present disclosure, and FIG. 16 is a diagram for illustrating a vehicle according to an embodiment of the present disclosure.

Referring to FIGS. 15 and 16, a battery pack 1 may include at least one battery module 10 according to the former embodiment and a pack case 50 for packaging the at least one battery module 10.

The at least one battery module may be provided as the battery module 10 of the former embodiment or may be provided in plural. When the battery module is provided in plural, the plurality of battery modules may be provided as a group of the battery module 10.

The battery pack 1 may be provided to a vehicle V as a fuel source of the vehicle V. As an example, the battery pack 1 may be provided to a vehicle V such as an electric vehicle, a hybrid vehicle, and various other-type vehicles capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as a vehicle V, which have the battery pack 1, include the battery module 10 as described above, and thus it is possible to implement a battery pack 1 having all the advantages of the battery module 10 described above, or devices, instruments, facilities or the like such as a vehicle V, which have the battery pack 1.

According to various embodiments as above, it is possible to provide the battery module 10, which may improve the efficiency of the assembling process, the battery pack 1 including the battery module 10, and the vehicle V including the battery pack 1.

In addition, according to various embodiments as above, it is possible to provide the battery module 10, which may improve weldability when performing welding to electrically connect the electrode leads 130 and the bus bar 500, the battery pack 1 including the battery module 10, and the vehicle V including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a plurality of battery cells stacked to be electrically connected to each other, each battery cell of the plurality of battery cells having a pair of electrode leads;
a plurality of cell cartridges each configured to cover a protruding portion of one of the electrode leads; and
a plurality of block bus bars respectively provided to the plurality of cell cartridges and respectively electrically connected to the electrode leads, the plurality of block bus bars each having a guide coupling formed on at least one side thereof to protrude along a stacking direction of the plurality of battery cells,
wherein the guide couplings of the plurality of block bus bars include:
a male coupling configured to protrude to one side in the stacking direction; and
a female coupling configured to protrude to another side in the stacking direction to be coupled to the male coupling; and
a bi-coupling configured to protrude to both sides in the stacking direction and configured to be connected to an external power source.

2. The battery module according to claim 1,
wherein the plurality of block bus bars are each formed in a predetermined length along a longitudinal direction of the plurality of cell cartridges, and
wherein the guide couplings of the plurality of block bus bars are provided to one end of the plurality of block bus bars.

3. The battery module according to claim 2,
wherein when the plurality of cell cartridges are stacked, the guide coupling of one of the plurality of block bus bars is coupled to the guide coupling of a facing one of the plurality of block bus bars in the stacking direction.

4. The battery module according to claim 1,
wherein the bi-coupling is provided to the block bus bar of the cell cartridge disposed at an outermost side among the plurality of cell cartridges.

5. The battery module according to claim 1,
wherein each of the plurality of battery cells includes:
an electrode assembly;
a battery case configured to accommodate the electrode assembly; and
the pair of electrode leads configured to protrude from both ends of the battery case and electrically connected to the electrode assembly,
wherein two of the plurality of cell cartridges are mounted to both ends of the battery case on which the pair of electrode leads protrude, respectively.

6. The battery module according to claim 5,
wherein the battery case includes:
a case body having an accommodation space for accommodating the electrode assembly; and
case terraces configured to extend from both ends, respectively, of the case body so that the pair of electrode leads protrude thereon,
wherein two of the plurality of cell cartridges support the pair of electrode leads and the case terraces, respectively.

7. The battery module according to claim 6,
wherein each cell cartridge includes an accommodation groove formed at one surface thereof for accommodating one of the electrode leads and one of the case terraces.

8. The battery module according to claim 7,
wherein a bus bar placing portion is provided to the accommodation groove for the block bus bar placed thereon.

9. A battery pack, comprising:
at least one battery module according to claim 1; and
a pack case configured to package the at least one battery module.

10. A vehicle, comprising:
at least one battery pack according to claim 9.

11. The battery module according to claim 1,
wherein each of the plurality of cell cartridges does not cover an entirety of the respective one of the plurality of battery cells.

12. The battery module according to claim 1,
wherein each of the plurality of battery cells includes an electrode assembly and a battery case configured to accommodate the electrode assembly;
wherein the battery case of each of the plurality of battery cells includes a case body having an accommodation space for accommodating the electrode assembly, and case terraces configured to extend from both ends, respectively, of the case body so that the pair of electrode leads protrude thereon; and
wherein each of the plurality of cell cartridges covers only a portion of the battery case of the respective one of the plurality of battery cells at one of the case terraces.

* * * * *